United States Patent
Nesper et al.

(10) Patent No.: US 9,761,867 B2
(45) Date of Patent: Sep. 12, 2017

(54) OPEN POROUS ELECTRICALLY CONDUCTIVE NANOCOMPOSITE MATERIAL

(75) Inventors: Reinhard Nesper, Amden (CH); Rahul Fotedar, Zurich (CH); Yoann Mettan, Regensdorf (CH)

(73) Assignee: Belenos Clean Power Holding AG, Bienne (CH)

( * ) Notice: Subject to any disclaimer, the term of this patent is extended or adjusted under 35 U.S.C. 154(b) by 415 days.

(21) Appl. No.: 12/722,269

(22) Filed: Mar. 11, 2010

(65) Prior Publication Data

US 2010/0233538 A1    Sep. 16, 2010

Related U.S. Application Data

(60) Provisional application No. 61/159,722, filed on Mar. 12, 2009.

(30) Foreign Application Priority Data

Apr. 1, 2009  (EP) .................................. 09157137

(51) Int. Cl.
  *H01M 4/136*  (2010.01)
  *H01M 4/58*  (2010.01)
  (Continued)

(52) U.S. Cl.
  CPC ............. *H01M 4/136* (2013.01); *H01M 4/58* (2013.01); *H01M 4/621* (2013.01); *H01M 4/366* (2013.01); *H01M 4/625* (2013.01); *Y02P 70/54* (2015.11)

(58) Field of Classification Search
  CPC .. H01M 4/621; H01M 4/622; H01M 10/0525; H01M 10/052; H01M 4/13; H01M 4/485; H01M 4/5825; H01M 4/525
  (Continued)

(56) References Cited

U.S. PATENT DOCUMENTS

| 4,849,309 A | * | 7/1989 | Redey et al. .................. 429/50 |
| 4,999,263 A | | 3/1991 | Kabata et al. |

(Continued)

FOREIGN PATENT DOCUMENTS

| DE | 10 2004 053479 A1 | 5/2006 |
| EP | 0 810 681 | 12/1997 |

(Continued)

OTHER PUBLICATIONS

Dissertation ETH No. 12281 by M. E. Spahr, "Synthese und Charakterisierung neuartiger Oxide, Kohlenstoffverbindungen, Silicide sowie nanostrukturierter Materialien und deren elektro- und magnetochemische Untersuchung" ("Synthesis and characterization of new types of oxides, carbon compounds, silicides and nano-structured materials and their electro- and magneto-chemical analysis."). 1997.

(Continued)

*Primary Examiner* — Barbara Gilliam
*Assistant Examiner* — Angela Martin
(74) *Attorney, Agent, or Firm* — Oblon, McClelland, Maier & Neustadt, L.L.P.

(57) ABSTRACT

Nanocomposits of conductive, nanoparticulate polymer and electronically active material, in particular PEDOT and LiFePO$_4$, were found to be significantly better compared to bare and carbon coated LiFePO$_4$ in carbon black and graphite filled non conducting binder. The conductive polymer containing composite outperformed the other two samples. The performance of PEDOT composite was especially better in the high current regime with capacity retention of 82% after 200 cycles. Hence an electrode based on composite made of conductive, nanoparticulate polymer and electronically active material, in particular LiFePO$_4$ and PEDOT nanostubs, with its higher energy density and increased resistance to harsh charging regimes proved to dramatically (Continued)

extend the high power applicability of materials such as LiFePO$_4$.

14 Claims, 7 Drawing Sheets

(51) Int. Cl.
    *H01M 4/62*     (2006.01)
    *H01M 4/36*     (2006.01)

(58) Field of Classification Search
    USPC .... 429/217, 209, 218.1, 221, 231.5; 427/58; 977/773, 948
    See application file for complete search history.

(56) References Cited

U.S. PATENT DOCUMENTS

| | | | |
|---|---|---|---|
| 5,139,901 | A | 8/1992 | Kawaguchi et al. |
| 5,418,090 | A | 5/1995 | Koksbang et al. |
| 5,437,940 | A * | 8/1995 | Hilston et al. ............. 429/103 |
| 7,229,713 | B2 | 6/2007 | Yamamoto et al. |
| 7,387,851 | B2 | 6/2008 | Gozdz et al. |
| 2002/0192551 | A1 | 12/2002 | Yoshizawa et al. |
| 2003/0099884 | A1 | 5/2003 | Chiang et al. |
| 2004/0131934 | A1 | 7/2004 | Sugnaux et al. |
| 2004/0202934 | A1 | 10/2004 | Zaghib et al. |
| 2004/0241532 | A1 | 12/2004 | Kim |
| 2005/0282070 | A1 | 12/2005 | Doh et al. |
| 2006/0127773 | A1 | 6/2006 | Kawakami et al. |
| 2007/0003749 | A1* | 1/2007 | Asgari ..................... 428/304.4 |
| 2007/0054187 | A1 | 3/2007 | Nuspl et al. |
| 2007/0148545 | A1 | 6/2007 | Amine et al. |
| 2007/0154805 | A1 | 7/2007 | Zaghib et al. |
| 2008/0128287 | A1* | 6/2008 | Wu et al. .................. 205/109 |
| 2008/0187831 | A1 | 8/2008 | Barker |
| 2008/0248393 | A1 | 10/2008 | Richard et al. |
| 2008/0285211 | A1 | 11/2008 | Zaghib et al. |
| 2009/0035662 | A1 | 2/2009 | Scott et al. |
| 2009/0305135 | A1* | 12/2009 | Shi ..................... B82Y 30/00 429/217 |
| 2010/0086855 | A1* | 4/2010 | Kohmoto et al. ......... 429/231.6 |
| 2010/0173198 | A1 | 7/2010 | Zhamu et al. |
| 2010/0176337 | A1* | 7/2010 | Zhamu et al. ............ 252/182.1 |
| 2010/0233538 | A1 | 9/2010 | Nesper et al. |
| 2010/0233546 | A1* | 9/2010 | Nesper et al. ............ 429/231.95 |
| 2010/0304204 | A1 | 12/2010 | Routkevitch et al. |
| 2011/0305945 | A1 | 12/2011 | Tada et al. |

FOREIGN PATENT DOCUMENTS

| | | | |
|---|---|---|---|
| EP | 1 244 114 A | | 9/2002 |
| EP | 1 244 168 A | | 9/2002 |
| EP | 1 672 730 | | 6/2006 |
| EP | 1 722 429 | | 11/2006 |
| EP | 1 881 544 A1 | | 1/2008 |
| EP | 2 237 346 A1 | | 10/2010 |
| JP | 08-078018 | * | 3/1996 .............. H01M 4/58 |
| JP | 10-162824 | | 6/1998 |
| JP | 11-135115 | | 5/1999 |
| JP | 11-167918 | | 6/1999 |
| JP | 2004-079311 | | 3/2004 |
| JP | 2005-032733 | * | 2/2005 ............ H01M 10/40 |
| JP | 2008-153122 | | 7/2008 |
| WO | 01/41238 A1 | | 6/2001 |
| WO | 2005/051840 A1 | | 6/2005 |

OTHER PUBLICATIONS

"Insertion Electrode Materials for Rechargeable Lithium Batteries" by Martin Winter, Jürgen O. Besenhard, Michael E. Sparh and Petr Novák in Advanced Materials 1998, Nov. 10, No. 10, pp. 725 to 763.

Office Action issued in co-pending related U.S. Appl. No. 12/722,281 on Mar. 1, 2012.
Yong-Jun Li, Wei-Jun Huang and Shi-Gang Sun, Angewandte Chemie, 118, 2599 (2006), "A Universal Approach for the Self-Assembly of Hydrophilic Nanoparticles into Ordered Monolayer Films at a Toluene/Water Interface".
Padhi, A.K., Nanjundaswamy, K.S. and Goodenough, J.B., J. Electrochem. Soc., 144, 1188 (1997), "Phospho-olivines as Positive-Electrode Materials for Rechargeable Lithium Batteries".
S. Franger, F. Le Cras, C. Bourbon and H. Rouault, Electrochem. Solid-State Lett., 5, A231 (2002), "LiFePO4 Synthesis Routes for Enhanced Electrochemical Performance".
S. Yang, P.Y. Zavalij and M.S. Whittingham, Electrochem. Commun., 3, 505 (2001), "Hydrothermal synthesis of lithium iron phosphate cathodes".
S. Franger, F. Le Cras, C. Bourbon and H. Rouault, J. Power Sources, 119, 252 (2003), "Comparison between different LiFePO4 synthesis routes and their influence on its physico-chemical properties".
Chung, S.-Y., Bloking, J.T. and Chiang, Y.-M., Nature Mater., 1, 123 (2002), "Electronically conductive phospho-olivines as lithium storage electrodes".
S.Y. Chung and Y.-M. Chiang, Electrochem. Sold-State Lett., 6, A278 (2003), "Microscale Measurements of the Electrical Conductivity of Doped LiFePO4".
F. Croce, A.D. Epifanio, J. Hassoun, A. Deptula, J. Olczac and B. Scrosati, Electrochem. Solid-State Lett., 5, A47 (2002), "A Novel Concept for the Synthesis of an Improved LiFePO4 Lithium Battery Cathode".
A. Yamada, S.C. Chung and K. Hinokuma, J. Electrochem. Soc., 148, A224 (2001), "Optimized LiFePO4 for Lithium Battery Cathodes".
Zhaouhui Chen and J.R. Dahn, J. Electrochem. Soc., 149, A1184 (2002), "Reducing Carbon in LiFePO4 ÕC Composite Electrodes to Maximize Specific Energy, Volumetric Energy, and Tap Density".
Prosini P.P., Zane, D. and Pasquali, M., Eletrochim. Acta, 46, 3517 (2001), "Improved electrochemical performance of a LiFePO4-based composite cathode".
G. Heywang and F. Jonas, Adv. Mater., 4, 116 (1992), "Poly (alkylenedioxyt hiophene)s- New, Very Stable Conducting Polymers".
L.B. Groenendaal, F. Jonas, D. Freitag, H. Pielartzik and J.R. Reynolds, Adv. Mater. Weinheim, Ger., 12, 481 (2000), "Poly(3,4-ethylenedioxythiophene) and Its Derivatives: Past, Present, and Future".
H. Yamato, M. Ohwa and W. Wernet, J. Electroanal. Chem., 379, 136 (1995), "Stability of polypyrrole and poly ( 3,4_ethylenedioxythiophene) for biosensor application".
I. Winter, C. Reese, J. Hormes, G. Heywang and F. Jonas, Chem. Phys., 194, 207 (1995), "The thermal ageing of poly ( 3,4-ethylenedioxythiophene).An investigation by X-ray absorption and X-ray photoelectron spectroscopy".
Vadivel Murugan A et al., "Rapid microwave-solvothermal systhesis of phospho-oliving nanorods and their coating with a mixed conducting polymer for lithium ion batteries," Electrochemistry Communication, vol. 10, No. 6, Jun. 1, 2008, pp. 903-906.
Yang et al., "Conducting polymeric nanoparticles synthisized in reverse micelles and their gas sensitivity based on quartz crystal microbalance," Polymer, vol. 48, No. 15, Jul. 5, 2007, pp. 4459-4465.
Xinyu Zhang et al., "Chemical Synthesis of PEDOT Nanotubes," Macromolecules, vol. 39, Jan. 1, 2006, pp. 470-472.
Search Report issued in corresponding application No. EP 09 15 7137, completed Sep. 7, 2009.
Office Action issued in co-pending related U.S. Appl. No. 12/721,669 on Jul. 19, 2012.
Extended European Search Report issued in corresponding application No. EP09166072, completed Nov. 30, 2009, mailed Dec. 7, 2009.
B.J. Neudecker et al., "Lithium silicon tin oxynitride (LiySiTON): high-performance anode in thin-film lithium-ion batteries for microelectronics," Journal of Power Sources, vol. 81-82, Sep. 1, 1999, pp. 27-32.

(56) References Cited

OTHER PUBLICATIONS

K.S. Park et al., "Characteristics of tin nitride thin-film negative electrode for thin-film microbattery," Journal of Power Sources, vol. 103, No. 1, Dec. 20, 2001, pp. 67-71.
M. Nishijima et al., "Electromechanical studies of a new anode material, Li3xMxN (M=Co, Ni, Cu)," Journal of Power Sources, vol. 68, No. 2, Oct. 1, 1997, pp. 510-514.
Non-Final Office Action issued in co-pending related U.S. Appl. No. 12/841,918 on Nov. 16, 2012.
Espacenet—Bibliographic data corresponding to JP 2005-032733 A, copywrited in 2005, and which corresponds to Exhibit A.
Ozan Toprackci et al., "Fabrication and Electrochemical Characteristics of LiFePO4 Powders for Lithium-ion Batteries," 28 Kona Powder and Particle Journal 50-72 (plus Author's bibliography)(2010).
L.S. Dent Glasser, "Symmetry," at http://www.iucr.org/education/pamphlets/13/full-text (downloaded Apr. 24, 2013).
Jae-Kwang Kim et al., "A modified mechanical activation synthesis for carbon-coated LiFePO4 cathode in lithium batteries," Material Letters, 61 (2007), 3822-3825.
Notice of Allowance issued in co-pending related U.S. Appl. No. 12/721,669 on Apr. 10, 2013.
"Homogenous," McGraw-Hill Dictionary of Scientific and Technical Terms 1005 (Elizabeth Geller et. al. eds., 6th ed. 2003).
"Homogenous," Webster's Ninth New Collegiate Dictionary 578 (9th ed. 1990).

\* cited by examiner

OPEN POROUS ELECTRICALLY CONDUCTIVE NANOCOMPOSITE MATERIAL

This application claims priority from U.S. Provisional Patent Application No. 61/159,722 of Mar. 12, 2009 and European Patent Application No. 09157137.2 of Apr. 1, 2009, the entire disclosure of which is incorporated herein by reference.

TECHNICAL FIELD

The invention relates to an electrode material for electrodes of rechargeable lithium batteries, based on a nanoparticulate lithium compound incorporated into a nanocomposite. The invention also relates to a method for the manufacture of such an electrode material.

BACKGROUND ART

Rechargeable lithium batteries are used especially in portable electronic equipment such as telephones, computers and video equipment and recently also in vehicles such as electric bicycles and cars. These applications place high demands on these batteries. In particular they should store the maximum amount of energy for a given volume or weight. They should also be reliable and environmentally-compatible. High energy density and high specific energy are thus two basic requirements which are placed in particular on the electrode material of such batteries.

A further important requirement for such electrode material is resistance to cycling. Here each cycle comprises one charging and discharge process. The resistance to cycling substantially determines the specific charge which is available after several cycles. Even with an assumed resistance to cycling of 99% in every cycle, the available specific charge after 100 cycles would be only 37% of the initial value. Even such a comparatively high value of 99% is therefore largely insufficient. A suitable rechargeable high-performance battery of the type described above should therefore be able not only to store a specific amount of energy at the lowest possible weight and volume, but should also have the ability to discharge and recharge this energy several hundred times. The critical factor here is to a large extent the electrode material.

On account of the major economic importance of such batteries, great efforts have been made to find electrode materials which meet the aforementioned requirements to the maximum extent.

To date, the materials used for the positive electrode of rechargeable lithium batteries have been in particular transition-metal oxides or transition-metal sulphides, organic molecules and polymers. In particular the transition-metal oxides and sulphides have proved successful in practice. Such materials are described as insertion electrode materials and are found in many batteries which are rechargeable at room temperature. The reason for the wider distribution of such materials lies in the fact that the electrochemical insertion reactions are topochemical and thus partially structure preserving.

The idea of a rechargeable battery based on lithium insertion reactions was developed in the 1970s. In the meantime, numerous electrodes based on this principle have been proposed and implemented. The rechargeability of lithium cells is based mainly on the dimensional stability of the guest material during the insertion and removal of $Li^+$.

As referred to above, several transition metal oxides, sulfides, phosphates and halogenides are known as easily reversible materials for positive electrodes. They include in particular lithium cobalt oxides, lithium nickel oxides, lithium manganese oxides, and lithium vanadium oxides, copper oxyphosphate, copper sulphide, lead sulphide and copper sulphide, iron sulphide, copper chloride etc. These materials are however to some extent unsuitable. Thus for example the lithium cobalt oxides are relatively expensive and not especially environmentally compatible. From the standpoint of environmental compatibility, the lithium manganese oxides would be particularly suitable. It has however been found that these oxides generally have a spinel structure which results in them having a lower specific charge or being less stable under cycling with respect to lithium exchange. Tests have also shown that, with the removal of lithium, orthorhombic lithium manganese oxide takes on a spinel structure. With regard to the prior art, reference is made here to the publication "Insertion Electrode Materials for Rechargeable Lithium Batteries" by Martin Winter, Jürgen O. Besenhard, Michael E. Sparh and Petr Novák in ADVANCED MATERIALS 1998, 10 Nov. no. 10, pages 725 to 763, and to dissertation ETH no. 12281 by M. E. Spahr, "Synthese und Charakterisierung neuartiger Oxide, Kohlenstoffverbindungen, Silicide sowie nanostrukturierter Materialien und deren elektro-und magnetochemische Untersuchung" ("Synthesis and characterization of new types of oxides, carbon compounds, silicides and nano-structured materials and their electro- and magneto-chemical analysis.").

Thus, there is still a great need for improved batteries, especially in terms of high specific energy and large power density.

DISCLOSURE OF THE INVENTION

The problem to be solved by the present invention is therefore to provide electrode materials for both, anodes and cathodes but preferably cathodes, which exhibit lower or no polarization during cycling and preferably have good electrochemical response/high discharge capacity and preferably are also comparatively environmentally-compatible.

The problem is solved by an electrode material that is a nanocomposite, said nanocomposite being
  an open porous material and
  electronically conducting.

In one embodiment the nanocomposite electrode material for positive or negative electrodes of rechargeable lithium batteries, said electrode material being a nanocomposite, said nanocomposite being an open porous material that comprises homogeneously distributed nanopariculate electronically active material and nanoparticulate electronically conductive binder material, with the average particle sizes of the nanoparticles of the electronically active material and the average particle sizes of the nanoparticulate electronically conductive binder material
  both preferably differing by no more than +100%/−50% (a factor 2) and/or both preferably being in the range of <500 nm.

An open porous material means that the pores are so large and so interconnected that electrolyte and $Li^+$-diffusion is easily possible.

It has now surprisingly been found that an open porous material can be easily obtained if the electronically active material (EAM), e.g. the electron and $Li^+$-releasing or the electron and $Li^+$-receiving material is in form of nanoparticles that are interconnected by nanoparticles of an electronically conductive binder (CB) of about the same particle size.

Provided that they are used in form of nanoparticles (further on referred to as nanoparticulate), even materials that are poorly conductive or even insulators when they are in the form of large pieces can be used as EAM for cathodes of the present invention. The only imperative requirement is that the material be able to release electrons and Li$^+$-ions.

Suitable EAM are all compounds that already comprise Li$^+$-ions or that can form Li comprising compounds during the first loading cycle. The generation of Li comprising compounds during loading is favoured in case of insufficiently stable or even unstable Li comprising compounds.

Examples of EAM are oxides, nitrides, carbides, borates, phosphates, sulfides, halogenides etc of transition metals and main group metals and mixtures thereof, but also all EAM mentioned in the state of the art, e.g WO 01/41238.

Nanoparticles as used herein in general have an average primary particle size in the range of 5 to 500 nm, preferably in the range of 5 to 400 nm, more preferred in the range of 20 to 300 nm.

Preferred EAM are $Li_xV_3O_8$, $Li_xH_nV_3O_8$, with $LiFePO_4$ being especially preferred at present.

Suitable EAMs for anode materials are silicon, alloys like $Li_xAlSi_n$, $Li_xSiSn_n$, and nitrides like $Li_xVN$.

According to the present invention, these EAM in nanoparticulate form are mixed with an electrically conducting binder (CB) that is also in nanoparticulate form and has similar mean particle sizes and optionally a conductive filler with similar particle size. Although it is possible to have the CB in the form of fibers, nanotubes etc, for cost reasons presently nanostubs or about spherical nanoparticles are preferred.

The nanocomposite of the present invention comprises the EAM and the CB nanoparticles and optionally the conductive filler particles intimately mixed with each other and preferably stabilized either due to sufficient stickiness of the binder at mixing storage and usage temperature, by a pressure treatment with or without heating or by solvent evaporation. A thermoplastic material with low glass transition point of the conductive binder is preferred not only for binding the particles but also for binding the nanocomposite to the conductor, usually an aluminium electrode/substrate.

Electrically conductive polymers encompass polyacetylene, polyaniline, polypyrrol and polythiophen. These polymers can be substituted or unsubstituted dependent on the desired features. A presently preferred binder is poly(3,4-ethylenedioxythiophene) referred to below as PEDOT. This polymer is conductive, has suitable stickiness and can readily be produced in nanoparticular form.

In a specific embodiment, the CB nanoparticles are present in an amount of 4 to 10% based on the weight of the nanocomposite.

In order to impart conductivity to, or to improve the conductivity of, the nanoparticles, they can advantageously be coated with a conductive layer, in particular with a carbon/graphite/graphene layer.

Methods for producing nanoparticulate EAM, coating nanoparticulate EAM, producing nanoparticulate CB, and producing a nanocomposite of the present invention are described below.

The EAM may be prepared via pyrolysis in case of oxides, nitrides etc. or via solvothermal synthesis, in particular in the case of $LiFePO_4$. The solvothermal process offers many advantages such as control over altering the morphology and size distribution of the synthesized particles. Inert gas required to protect the substance is needless or negligible in solvothermal synthesis and the process is generally much faster, energy efficient and successful with respect to nanoparticle formation than the normal shake and bake synthesis. $LiFePO_4$ samples are preferably prepared by an optimized solvothermal synthesis as described by Nuspl et al. [1] using the following reaction:

$$FeSO_4 + H_3PO_4 + 3LiOH\cdot H_2O \rightarrow LiFePO_4 + Li_2SO_4 + 11H_2O$$

Carbon coating of nanoparticulate EAM may be performed by carbon deposition via pyrolysis of various organic precursors such as e.g. sugars or ketones.

Nanoparticulate electrically conductive polymers such as PEDOT may be prepared using the reverse microemulsion technique as described by Sun et al. [2]. In the case of PEDOT synthesis, a microemulsion is prepared comprising emulsified oxidant comprising particles/droplets such as $FeCl_3$/bis(2-ethylhexyl)sulfosuccinate particles as polymerization aid.

For forming the nanocomposit of the present invention, the nanoparticulate CP, optionally together with a nanoparticulate electronically conducting filler such as carbon black, is preferably suspended in a suitable solvent such as acetonitril, and the nanoparticulate EAM is then added and the mixture homogenized, dried and optionally pressed with or without heating (As an option, the EAM nanoparticules may have been carbon coated during a previous step).

BRIEF DESCRIPTION OF THE DRAWINGS

The invention will be better understood and objects other than those set forth above will become apparent from the following detailed description thereof. Such description makes reference to the annexed drawings, wherein:

FIGS. 6A and 6B compare the performance of carbon coated $LiFePO_4$ with conventional (LC) and inventive (LP) binder at a specific current of 135 mAh g$^{-1}$ (~0.8 C), where

MODES FOR CARRYING OUT THE INVENTION

The invention will now be further described for the system $LiFePO_4$ and PEDOT.

LiFePO$_4$ is a very promising EAM because it can be produced from inexpensive precursors, is of nontoxic nature, environmentally benign and has remarkable chemical and thermal stability. The material facilitates exceptionally fast lithium ion mobility making it desirable for high power application [3]. However, the low intrinsic electronic conductivity of this material severely limits its electrochemical response [3]. Several attempts to improve its properties have been made such as reducing its particle size [4-6], coating with ultra thin carbon [7], doping with supervalent ions [8], adding metallic particles in the electrode composite [9] are some of the methods that all did not lead to acceptable let alone good results.

The most significant enhancement in the performance of LiFePO$_4$ has been obtained by surface coating it with carbon deposited via pyrolysis of various organic precursors such as sugars etc. It is also known that the rate capacity of a battery can be significantly improved by reducing the particle size which results in enhancing the solid state diffusion of lithium in the electrode material [10]. However, the use of nanostructured EAM causes tribulations as the increased surface owing to small particle size requires much higher amount of carbon/graphite and binder in the electrode composite which leads to a considerable decrease in the tap density of the battery [10-12]. Hence one needs to juggle between the size of the particles and the amount of conductive and other additives added to design the most optimum electrode composition. Polymeric binders such as polyvinylidene fluoride (PVDF), polytetrafluoroethylene (PTFE), polyisobutene etc. are currently engaged to bind the graphite, carbon black and active material (e.g. LiFePO$_4$) together and with the current collector. The net amount of binder and other conductive additives for nanospherical particle typically add up to more than 20% mass in the electrode. More so the binders which are presently employed are electrochemically and electronically inactive and hence substantially decrease the specific energy and the kinetics of the cathode by adding additional weight and reducing the conductivity of the cathode composite respectively. All in all, it results in diminishing the attractiveness of the material for high power applications.

The inventors assumed that nanostructured polymeric binder which could be dually utilized as an effective conductive additive and a binder in the electrode composite could potentially alleviate this problem and additionally enhance the high rate performance of the battery. Such nanostructured polymeric binder has now been found to have several advantages. If suitable nanoparticle sizes and shapes are used, the binder homogeneously intermixes with the nanoparticulate EAM. Due to the particulate structure, pores are formed that facilitate Li$^+$ diffusion and the nanoparticles or the presence of pores, respectively, leads to reduced amounts of binder needed and therewith to reduced weight, as well as to enhanced electrochemical properties, i.e. power density and specific energy.

Poly(3,4-ethylenedioxythiophene) (PEDOT) is an attractive candidate as a conductive polymeric binder. In addition to the virtue of high chemical and environmental stability the synthesis of PEDOT in various particle sizes and morphologies has previously been studied extensively. [12-16] The monomer 3,4-ethylenedioxythiophene displays higher hydrophobicity and slower kinetics than pyrrole which results in its relatively straightforward synthesis to PEDOT as nanostubs or nanoparticles as opposed to the formation of tubular structures. This morphology was found to be beneficial for nanoparticles such as LiFePO$_4$ particles which have been synthesized in the same size and conformation and hence can mix together in a uniform composite.

A further advantage is its stickiness that leads to a good interparticular adhesion and sufficient substrate adhesion upon pressurizing with a pressure of 0.5 to 2 bar or $5 \cdot 10^4$ to $2 \cdot 10^5$ Pa, respectively, at room temperature.

Dependent on the stability desired, heating may not be necessary since the small particles are sticky due to enhanced surface reactivity and Van-der-Waals forces.

Nanocomposites such as the one of PEDOT and LiFePO$_4$ may be synthesized successfully using the technique of reverse microemulsion. The distinctive beneficial effect of reverse microemulsion directed synthesized nanostructured poly(3,4-ethylenedioxythiophene) and the structural properties of such composite have been studied and its electrochemical properties have been compared with the bare and the carbon coated LiFePO$_4$.

Thereby it was found that a composite of conductively coated EAM, namely LiFePO$_4$, in nanoparticulate form together with a conductive polymeric binder in nanoparticulate form results in much improved features.

For further improvement of the features, the nanoparticulate binder may be admixed with an electronically conductive nanoparticulate filler such as carbon black, e.g. in an amount of 2 to 10% by weight of the whole electrode material, preferably around about 5%.

Experimental

I. Materials Preparation

I. 1. Lithium Iron Phosphate

Lithium iron phosphate samples were prepared by an optimized solvothermal synthesis. Starting materials were FeSO$_4$.7H$_2$O (Aldrich, purity 99%), H$_3$PO$_4$ (Aldrich, purity >85%), LiOH (Aldrich, purity >98%) in the stoichiometric ratio 1:1:3. Initially FeSO$_4$ and H$_3$PO$_4$ water solutions were prepared and mixed together. The mixture was transferred to a Parr Autoclave which is flushed several times with nitrogen. The solution of LiOH is slowly pumped into the reaction mixture before sealing of the autoclave. The reaction mixture is deagglomerated and heated overnight at 160° C. The precipitate obtained is filtered and washed extensively with water to remove all excess salts etc. The wet precipitate is then dried overnight in vacuum to form dry olive green solid powder of LiFePO$_4$.

1.2. Carbon Coated Samples

LiFePO$_4$ was coated with carbon using several carbon containing organic precursors. Separate batches of carbon coated LiFePO$_4$ were synthesised using polyacrylonitrile (PAN), 1,2,4,5-benzenetetracarboxylic acid (pyromellitic acid) and lactose respectively. In a typical experiment, a specified amount of precursor (table 1) was mixed with 100 mg of LiFePO$_4$ in a liquid medium to form a well dispersed suspension. The suspension was dried and subsequently fired by heating it to 650° C. at a speed of 2.5° C. min$^{-1}$ and keeping it at said temperature for six hours. The heat treatment was done in an inert nitrogen environment or in vacuum to avoid oxidation of Fe$^{+2}$ to Fe$^{+3}$.

Table 1 shows the weight of initial amount of the organic precursor added and the final carbon content of the coated sample with respect to the weight of LiFePO$_4$. The amount of carbon was thermogravimetrically determined.

TABLE 1

Organic precursor usage details and final carbon content

| Organic precursor | Solvent | Amount added (wt. %) | Carbon Content (wt. %) |
|---|---|---|---|
| Polyacrylonitrile (PAN) | n-Butanol | 10 | 2.14 |
| Pyromellitic acid | Water | 1.05 | 0.85 |
| Lactose | Water | 15 | 2.1 |

Figure 1:
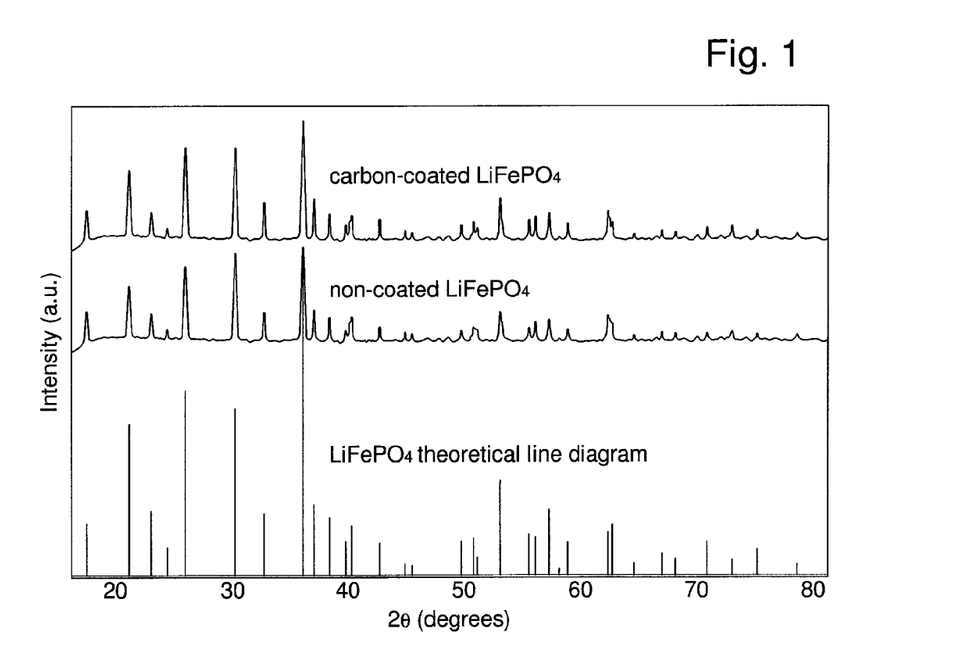
FIG. 1 shows the XRD pattern of $LiFePO_4$ with and without carbon coating.

Additionally, propylene gas was thermally cracked to deposit carbon on LiFePO$_4$ in a flow oven. The temperature of the oven was set to be 700° C. The flow rate of the gas was 20 ml min$^{-1}$ and the process was carried out for 4 hours. The amount of carbon deposited was ~0.1 wt. %. The XRD patterns of all carbon coated samples match perfectly with the pristine LiFePO$_4$ and the presence of carbon does not hamper the crystallinity in any way. FIG. 1 shows the RD pattern of carbon coated LiFePO$_4$ through lactose compared with the pristine LiFePO$_4$. The particle size distribution of the carbon coated sample which is obtained after annealing is broader than that of the as synthesised pristine LiFePO$_4$. This might have resulted due to the Oswald ripening of the primary particles at high temperature. However, the particle size distribution remains narrow enough as lithium ions can still diffuse effectively through the LiFePO$_4$/FePO$_4$ volumes and the discharge capacity is not affected even at high exchange rates.

Figure 2:
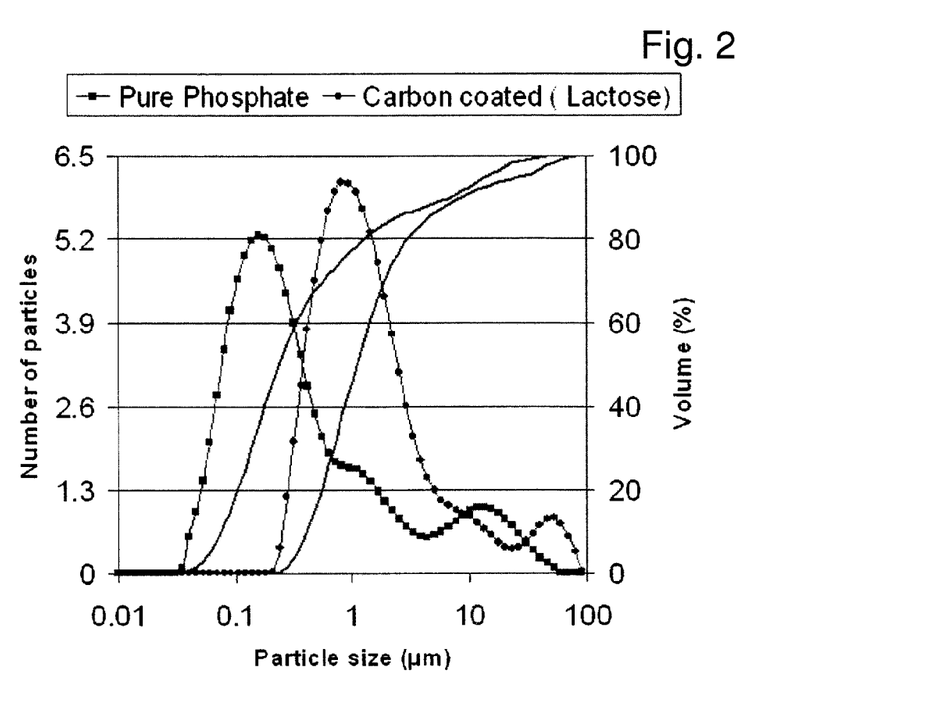
FIG. 2 shows a comparison of the particle size distribution of carbon coated and pristine $LiFePO_4$.

A comparison of the particle size distribution of the carbon coated sample prepared by the composition of lactose to the pristine, uncoated LiFePO$_4$ is shown in FIG. 2. The D80 value of the carbon coated sample was found to be less than or equal to 30 μm, which has roughly grown by a factor of three in comparison to the primary sample.

The extremely thin amorphous layer of carbon around the carbon coated LiFePO$_4$ particles can be depicted by high resolution TEM (not shown). The average thickness of the layer was found to be around 2 nm. The layer appeared to be highly porous which must facilitate easy diffusion of lithium ions into and from the active material. Also visible in good TEM images is the distance between the [301] separation place of the olivine LiFePO$_4$ which is around 3 Å.

In a preferred procedure, the carbon coated sample was made by heat treatment in the presence of lactose (15% by weight) in an inert environment. After drying, the powders were fired at 650° C. (heating to said temperature with a speed of 2.5° C. min$^{-1}$ and keeping the powders at said temperature took a total of 6 hours), followed by a milling or deagglomeration process. The amount of carbon was thermogravimetrically determined to be less than 3% by weight.

1.3. Preparation of PEDOT Nanostubs Via Reverse Emulsion Directed Synthesis

The technique of reverse microemulsion in the lines of Sun et al. [2] was employed for the synthesis of PEDOT nanoparticles. Initially 8.5 g (19.12 mmol) of sodium bis(2-ethylhexyl)sulfosuccinate (AOT) was dissolved in 70 ml of n-hexane in an ultrasonic bath at 100% power (410 W). Then a mixture of 1.6 g (10.00 mmol) anhydrous FeCl$_3$ in 1 ml distilled water was added dropwise with a Pasteur-pipette. When all the oxidant was added, the resulting solution was taken out of the ultrasonic bath and gently shaken by hand until a milky-yellow precipitate appeared. Then 0.38 ml of ethylenedioxythiophene (EDOT) was added to the emulsion at once. The resulting mixture was then kept at 10° C. in the rotavap for 1 h. Polymerization started when the temperature of the water bath reached about 20° C. After that the temperature of the water bath was maintained at 30° C. for 3 h. Meanwhile the reaction mixture turned green and subsequently black. The product was then suction filtered and washed with ethanol and acetone. Drying at 100° C. over night yielded a blue/black nanopowder of PEDOT.

II. Chemical, Electrochemical and Structural Characterisation

Due to the strong fluorescence of iron, an X-ray powder diffractometer Bruker AXS mod. D8 Advance with Bragg-Bentano geometry was used, with λCuKα1=1.54056 Å radiation (40 mA, 40 kV) and a germanium monochromator. The samples were mounted on a rotating flat plate holder. A quarz sample has been used as external standard.

Scanning electron microscopy (SEM) analysis was performed using a Zeiss Gemini 1530 operated at 1 kV. For the measurements of Transmission Electron Microscopy (TEM), the material was deposited onto a holey carbon foil supported on a copper grid. TEM investigations were performed using a C30ST microscope (Philips; LaB6 cathode, operate at 300 kV, point resolution ~2 Å). Conductivity was measured using a four point conductivity testing method.

III. Electrochemical Measurement

The composition of the three samples analysed are summarized in the Table 2, wherein L1 designates a reference material obtained with pristine, uncoated LiFePO$_4$, LC designates a reference material with carbon coated LiFePO$_4$, and LP designates a material of the present invention mixture of carbon coated LiFePO$_4$ and PEDOT nanoparticles.

For electrochemical measurement, electrodes of L1 and LC were made by mixing them with carbon black, graphite and a polyisobutene based polymeric binder. The ingredients were mixed in the following ratio, Active material:Ensaco 250 (TIMCAL):Graphite SFG6 (TIMCAL):Oppanol (BASF)=75:18:6:2. Active material and additives were mixed and grained together by hand in a mortar until visual mechanical homogenization was reached (35 min). The mortar was warmed up at 90° C. and an Oppanol solution of 0.2% in n-Hexane was added to the mixture. The suspension was mixed up until the complete evaporation of n-Hexane. 15 to 30 mg of the sample was then hand pressed on a pill (13 mm diameter) and then the prepared cathode was dried out. Only 5% carbon and no graphite is used in the mixture LP to be used as an electrode.

TABLE 2

| Sample | LiFePO$_4$ | binder | carbon black and graphite filler |
|---|---|---|---|
| L1 | uncoated (75%) | polyisobutene based binder (2%) | 24% |
| LC | C-coated (75%) | polyisobutene based binder (2%) | 24% |
| LP | C-coated (85%) | PEDOT (10%) | 5% |

For the preparation of the LP sample PEDOT nanoparticles were dispersed in acetonitrile solution and then mixed 10% by weight with the pristine LiFePO$_4$.

The cells were assembled in an argon filled glove box using lithium metal foil as the counter electrode. The electrolyte used was MERCK Selectipur, LP30, which consists of 1 M solution of LiPF$_6$ in mixture of ethylene carbonate and dimethyl carbonate 1:1 (w/w).

All electrochemical measurements were performed using a computer-controlled charger system furnished by Astrol Electronic AG, Switzerland. The cells were cycled galvanostatically in the range of 1.5-4.0 V vs. Li/Li$^+$ at a specific current based on the weight of active material (LiFePO$^4$) in the composite.

Results and Discussion

I. Influence of Structure and Morphology

Figure 3:
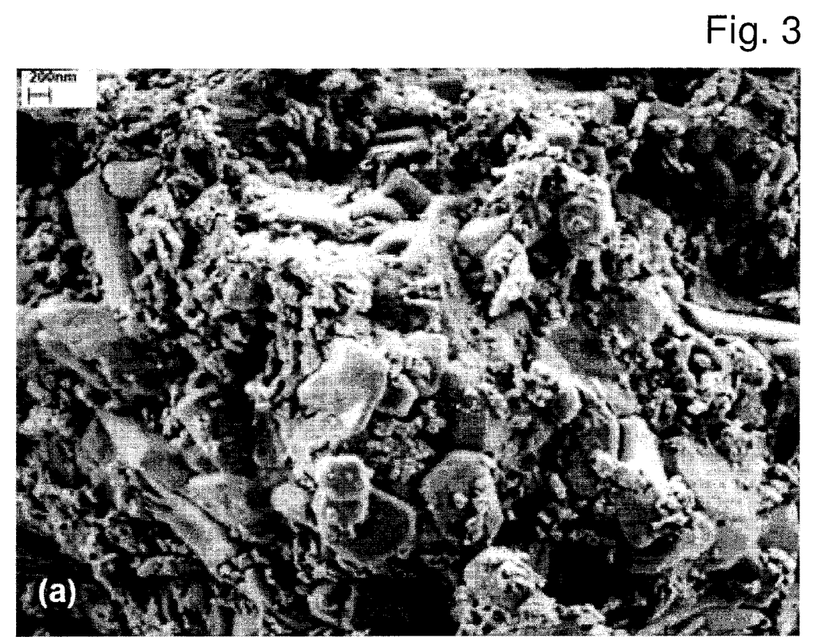
FIG. 3 shows the SEM picture of the battery composite consisting of carbon coated $LiFePO_4$, graphite and a standard binder.
Figure 4:
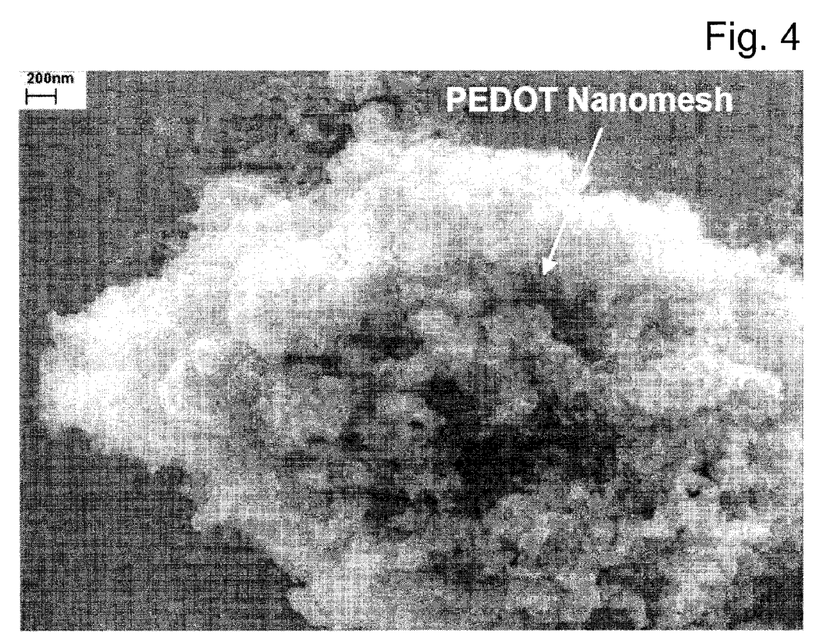
FIG. 4 shows the product of a reverse microemulsion directed synthesis of PEDOT resulting in the formation of nanosized mesh with the porous structure being formed from the agglomeration of individual PEDOT nanostubs.

FIG. 1 shows the XRD pattern of L1 which consistent to an orthorhombic crystal structure with space group Pnma. The patterns correspond perfectly to the theoretical pattern of LiFePO$_4$ and no impurities were detected. The XRD pattern of the carbon coated sample LC matches perfectly with the bare sample L1 and the presence of carbon does not hamper the crystallinity in any way. The primary particle size is calculated using the Scherrer formula, d=0.9$\lambda$/$\beta$ cos $\Phi$, where $\beta$ is the width at the half maximum of the XRD line and $\lambda$ is the wave length in angstroms. The single crystal size estimated using the width derived from the XRD (020) line is 31.6 nm. A SEM image of LC1 (not shown) illustrates that the grains had a distinct elliptical morphology with an average particle size of 200 nm. The morphology of the LC had no significant difference from L1. The high solution TEM image of LC (not shown) depicts the extremely thin amorphous layer of carbon around the LiFePO$_4$ particles. The average thickness of the layer was measured to be around 2 nm. The layer appeared to be highly porous which must facilitate easy diffusion of lithium ions inside the active material. The interplanar distance was deciphered to be ~3 Å which closely resembles the [301] plane separation of the olivine. The carbon coated sample had conductivity in the range of 10$^{-4}$ S/cm which is several magnitudes higher than pristine LiFePO$_4$ (10$^{-9}$ S/cm). A SEM picture of the battery composite consisting of LC, graphite and the standard binder (not shown or FIG. 3) illustrates that microsized graphite which should ideally act as conductive interconnect between the insulating LiFePO$_4$ particles is completely out of range in comparison to the nanosized active material. It remains as an isolated island in the matrix and hardly benefits the electron percolation network despite significantly contributing to the weight of the electrode composite. This problem was successfully solved in LP. The reverse microemulsion directed synthesis of PEDOT lead to the formation of nanosized mesh (not shown or shown in FIG. 4). The porous structure is formed from the agglomeration of individual PEDOT nanostubs. The conductive porous nanomesh of PEDOT particles completely wraps the LiFePO$_4$ particles thus rendering the whole composite to be much more conductive. PEDOT particles also act as a binder to bind the electrode ingredients together and with the current collector. This makes the use of any separate binder unnecessary hence alleviating inactive mass from the bulk of the electrode.

II. Electrochemical Results

Figure 5:
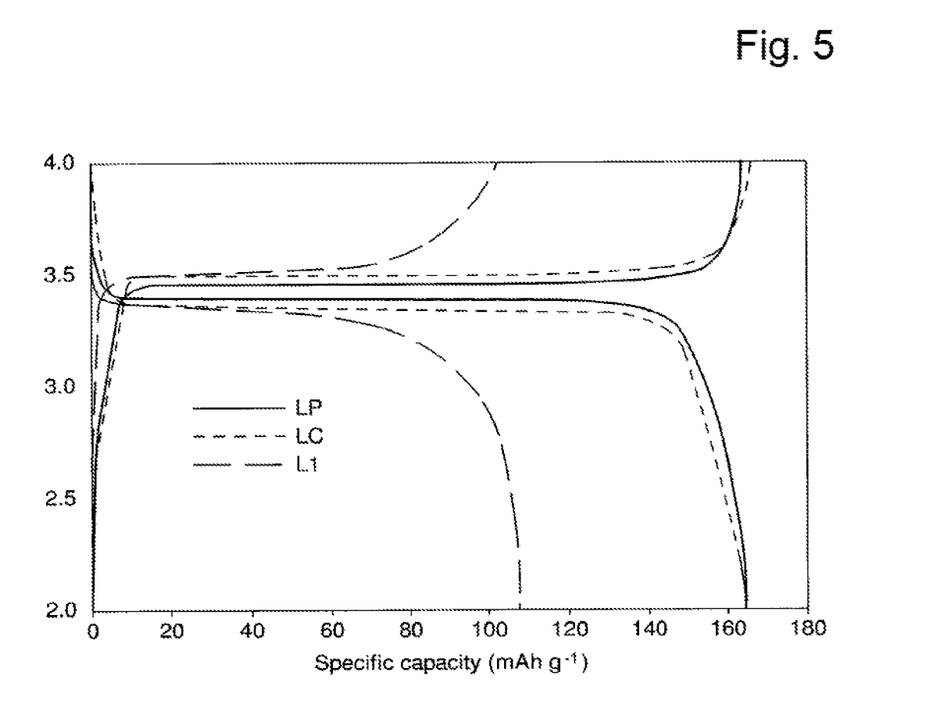
FIG. 5 shows the initial discharge capacity of three samples, namely $LiFePO_4$ with conventional binder and filler, carbon coated $LiFePO_4$ with conventional binder and filler and a composition of the present invention, cycled at a specific current of 20 mA (~0.1 C).

This electrochemical properties of all the samples were systematically investigated. FIG. 5 shows the initial discharge capacity of all three samples cycled at a specific current of 20 mA (~0.10). All the samples have an exceptional flat voltage plateau. At this relatively low current both the carbon coated sample (LC) and the polymer composite sample (LP) boast a capacity around 166 mAh g$^{-1}$ which is very close to the theoretical capacity of 170 mAH g$^{-1}$ for LiFePO$_4$. The uncoated sample (L1) has a start capacity of 110 mAh g$^{-1}$ which is significantly lower than the other two samples. For all three samples the discharge capacity at this current remains stable for a very high number of cycles. This discrepancy in performance clearly illustrates the influence of conductivity on the performance of the electrode.

Figure 6A:
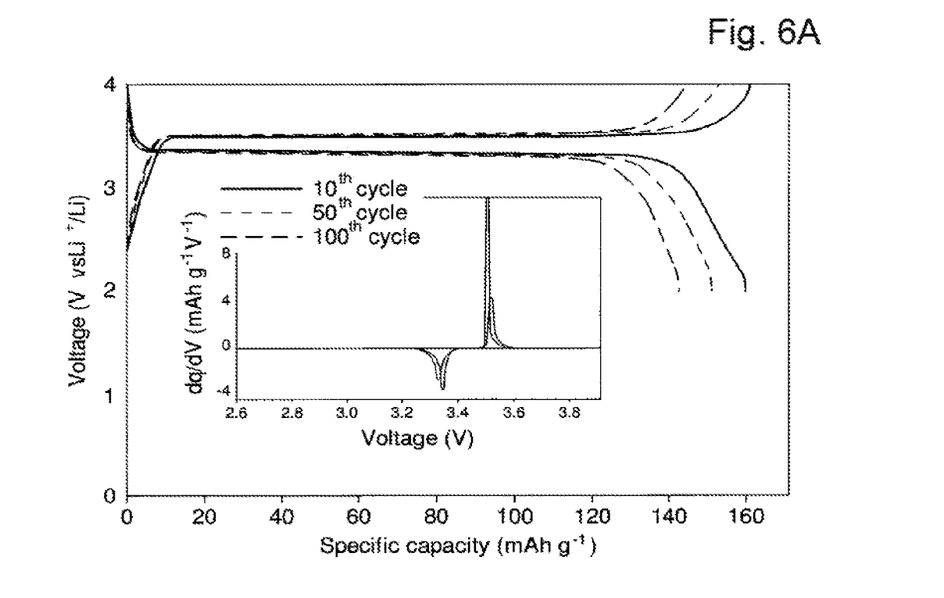
FIG. 6A shows the subsequent discharge curves for the 10$^{th}$, 50$^{th}$, and 100$^{th}$ cycle for LC.
Figure 6B:
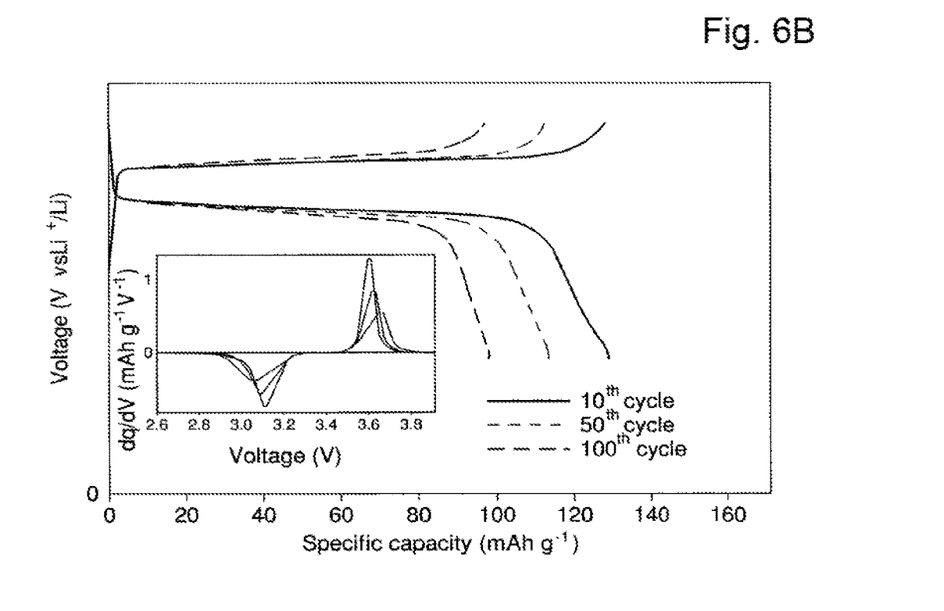
FIG. 6B shows the subsequent discharge curves for the 10$^{th}$, 50$^{th}$, and 100$^{th}$ cycle for LP.
Figure 7:
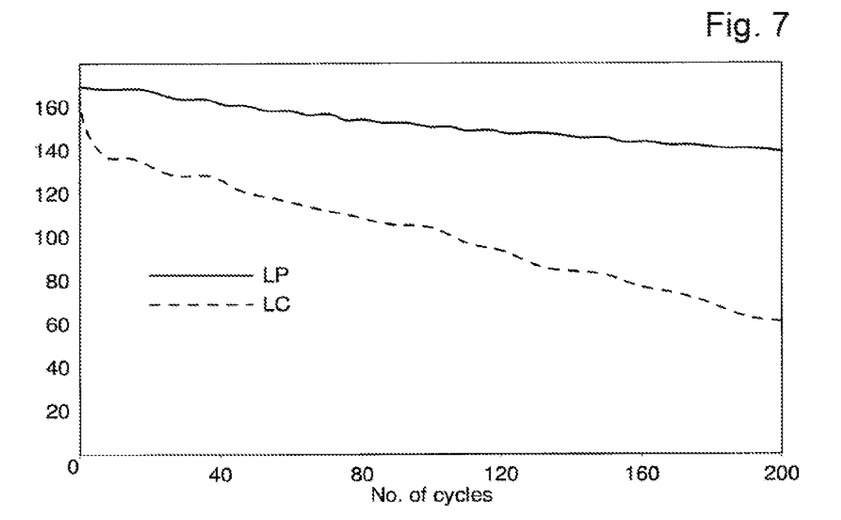
FIG. 7 shows for both, the LC and the LP samples for the next 100 cycles compared to 56 mAh g$^{-1}$ for LC.

Due to the obvious and significant difference between the performance of the coated and the uncoated active material we proceed only with the testing of LC and LP a higher currents. FIG. 6A and FIG. 6B compare the performance of LC and LP at a specific current of 135 mAh g$^{-1}$ (~0.80). The initial discharge capacity of LP is 158.5 mAh g$^{-1}$. FIG. 6A shows the subsequent discharge curves for the 10$^{th}$, 50$^{th}$ and 100$^{th}$ cycle. The capacities at these cycles are 158 mAh g$^{-1}$, 159 mAh g$^{-1}$ and 141 mAh g$^{-1}$, respectively. This represents a drop of around 0.17 mAh g$^{-1}$ per cycle and implies that 90% of the initial discharge capacity is retained after 100 cycles. In contract, the sample LC has a initial discharge capacity of 145 mAh g$^{-1}$ which is followed by 128 mAh g$^{-1}$, 112 mAh g$^{-1}$ and 97 mAh g$^{-1}$ for the 10$^{th}$, 50$^{th}$ and 100$^{th}$ cycle respectively. This represents a drop of around 0.33 mAh g$^{-1}$ per cycle and only 67% of the original capacity is retained after 100 cycles. Hence for LP both the start capacity and the capacity retention are significantly better than LC. Both the sample show almost linear decline with the same rate for the next 100 cycles as show in FIG. 7. The final discharge capacity of LP after 2100 cycles is 130 mAh g$^{-1}$ compared to 56 mAh g$^{-1}$ for LC.

The inset of FIG. 6A show the differential specific capacity plots (DSCP) for both these samples at the corresponding 10$^{th}$, 50$^{th}$ and 100$^{th}$ discharge cycle. The peak of these differential specific capacity plots corresponds to the anodic and cathodic plateau of the lithium intercalation/deintercalation from the active material. Both the anodic and the cathodic peak occur around 3.4 V which is the lithium extraction/insertion potential in LiFePO$_4$. The main differences between the two plots are the polarization gap between the anodic and the cathodic peak and the intensity of the peaks. In the case of LP the separation is around 0.1 V whereas its 0.6 V in LC. This separation indicates the amount of overpotential in the electrode mix which primarily suggests higher electrode resistance in LC. The peak intensity of the polymer composite LP is much higher than LC which indicates better Li insertion kinetics than the latter.

Figure 8:
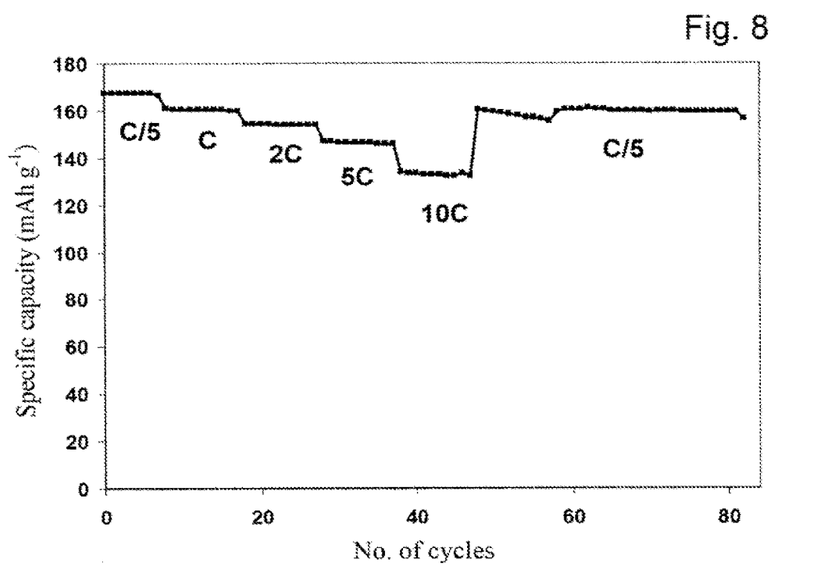
FIG. 8 depicts the discharge potential as a function of number of cycles at various currents.
Figure 8A:
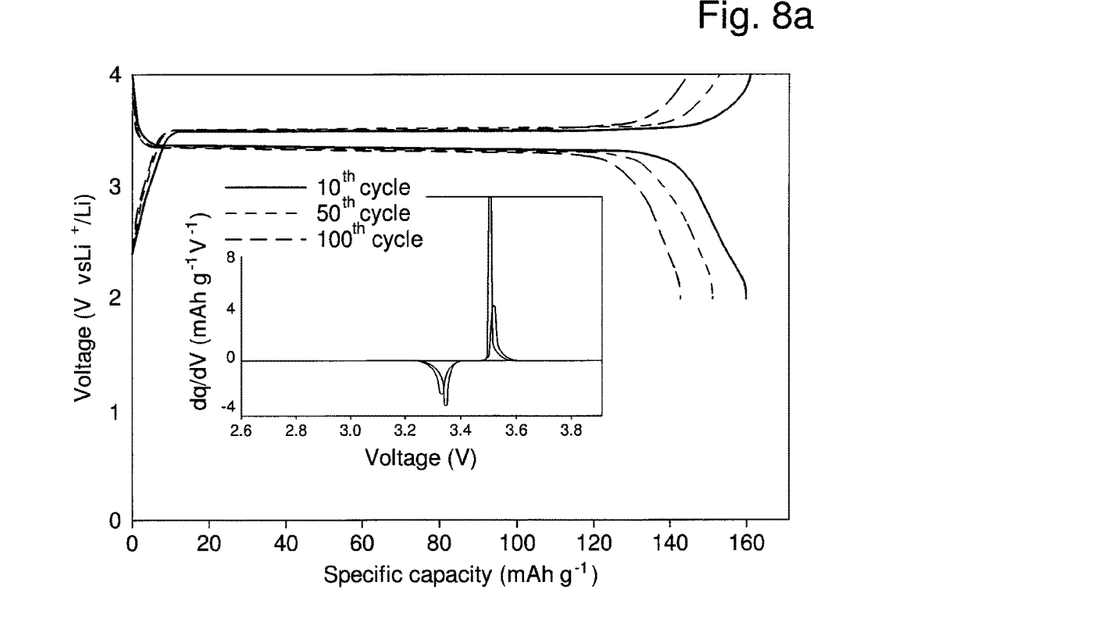
Figure 8B:
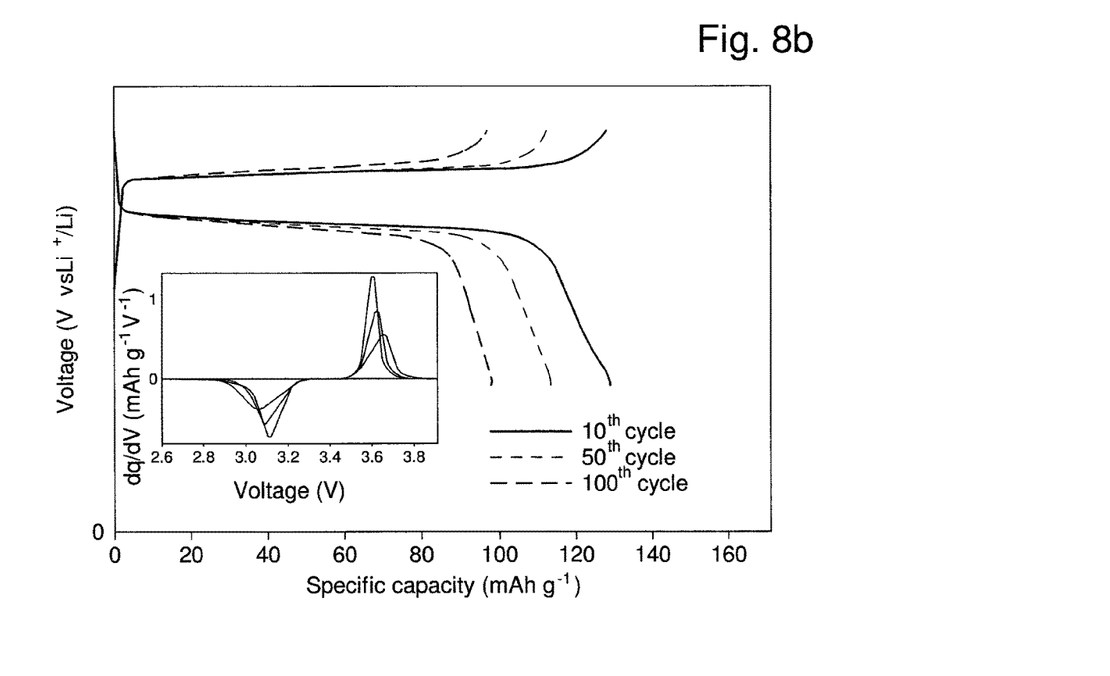
Figure 9:
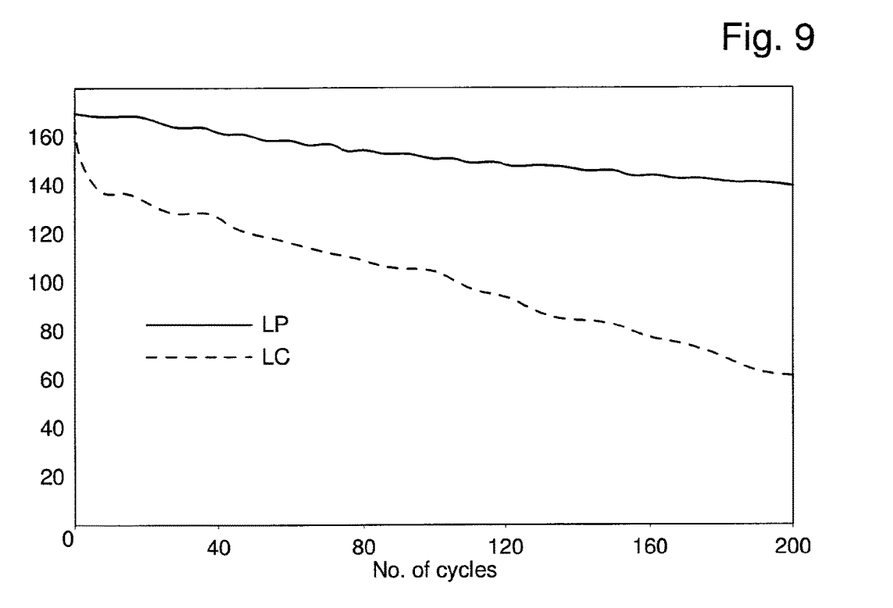
Figure 10:
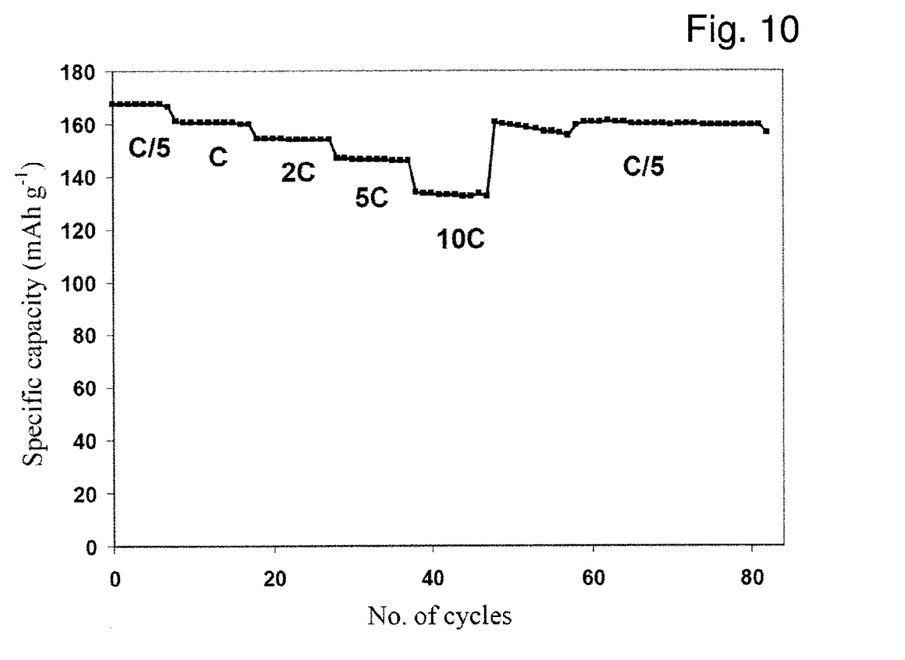

To study the influence of even severe conditions on LP, the sample was tested in a range of current densities. FIG. 8 depicts the discharge potential as a function of number of cycles at various currents. At C/5 the samples exhibits an almost theoretical capacity of 170 mAh g$^{-1}$. This value steadily decreases with the increase of current but even at a high current corresponding to 10 C a relatively steady discharge capacity of around 130 mAh g$^{-1}$ is observed. After the current is dropped to its initial value most of the original capacity is retained.

The performance of the composite of PEDOT and LiFePO$_4$ was significantly better compared to the bare and carbon coated LiFePO$_4$. The conductive polymer containing composite outperforms the other two samples while having only 50% of their total additive content with respect to the weight of the electrode.

While there are shown and described presently preferred embodiments of the invention, it is to be distinctly understood that the invention is not limited thereto but may be otherwise variously embodied and practiced within the scope of the following claims.

REFERENCES

[1] Nuspl, G. Wimmer, L. and Eisgruber, WO 2005/051840 A1 (2005)
[2] Yong-Jun Li, Wei-Jun Huang and Shi-Gang Sun, Angewandte Chemie, 118, 2599 (2006)
[3] Padhi, A. K., Nanjundaswamy, K. S., and Goodenough, J. B., J. Electrochem. Soc., 144, 1188 (1997)

[4] S. Franger, F. Le Cras, C. Bourbon and H. Rouault, Electrochem. Solid-State Lett., 5, A231 (2002)
[5] S. Yang, P. Y. Zavalij and M. S. Whittingham, Electrochem. Commun., 3, 505 (2001)
[6] S. Franger, F. Le Cras, C. Bourbon and H. Rouault, J. Power Sources, 119, 252 (2003)
[7] Chung, S.-Y., Bloking, J. T. and Chiang, Y.-M., Nature Mater., 1, 123 (2002)
[8] S. Y. Chung and Y.-M. Chiang, Electrochem. Sold-State Lett., 6, A278 (2003)
[9] F. Croce, A. D. Epifanio, J. Hassoun, A. Deptula, J. Olczac and B. Scrosati, Electrochem. Solid-State Lett., 5, A47 (2002)
[10] A. Yamada, S. C. Chung and K. Hinokuma, J. Electrochem. Soc., 148, A224 (2001)
[11] Zhaouhui Chen and J. R. Dahn, J. Electrochem. Soc., 149, A1184 (2002)
[12] Prosini P. P., Zane, D. and Pasquali, M., Eletrochim. Acta, 46, 3517 (2001).
[13] G. Heywang and F. Jonas, Adv. Mater., 4, 116 (1992)
[14] L. B. Groenendaal, F. Jonas, D. Freitag, H. Pielartzik and J. R. Reynolds, Adv. Mater. Weinheim, Ger., 12, 481 (2000)
[15]H. Yamato, M. Ohwa and W. Wernet, J. Electroanal. Chem., 379, 136 (1995)
[16] I. Winter, C. Reese, J. Hormes, G. Heywang and F. Jonas, Chem. Phys., 194, 207 (1995)

What is claims is:

1. A nanocomposite electrode as a positive or negative electrode of a rechargeable lithium battery, comprising:
an open porous nanocomposite material including a homogenous intermixed distribution of a nanoparticulate electronically active material having a first average particle size and a nanoparticulate electronically conductive material having a second average particle size, the first average particle size and the second average particle size being about the same size and differing by a factor of no more than 2, and are in a range of 5 nm to 500 nm,
wherein the nanoparticulate electronically conductive material is poly(3,4-ethylenedioxythiophene) in the form of nanostubs or of about spherical nanoparticles, and
wherein the open porous nanocomposite material has a conductive porous nanomesh structure including an agglomeration of the nanoparticulate electronically conductive material that completely wraps nanoparticles of the nanoparticulate electronically active material.

2. The nanocomposite electrode of claim 1, wherein the nanocomposite electrode is the positive electrode and the electronically active material is selected from the group consisting of oxides, nitrides, carbides, borates, phosphates, sulfides, and halogenides of transition metals and main group metals and mixtures thereof.

3. The nanocomposite electrode of claim 2, wherein the electronically active material is $LiFePO_4$.

4. The nanocomposite electrode of claim 1, wherein the nanocomposite electrode is the negative electrode and the electronically active material is an anode material selected from the group consisting of silicon, alloys, and nitrides.

5. The nanocomposite electrode of claim 1, wherein the nanoparticles of the nanoparticulate electronically active material are coated with a conductive layer that comprises a carbon or graphite/graphene layer.

6. The nanocomposite electrode of claim 1, wherein the first average particle size and the second average particle size are in the range of 5 nm to 400 nm.

7. The nanocomposite electrode of claim 1, wherein the nanoparticulate electronically conductive material is present in an amount of about 4% to about 10% based on weight of the open porous nanocomposite material.

8. The nanocomposite electrode of claim 1, further comprising at least one nanoparticulate electrically conducting filler material in an amount of about 2% to about 10% based on weight of the open porous nanocomposite material.

9. The nanocomposite electrode of claim 4, wherein the anode material includes alloys that are selected from the group consisting of $Li_xAlSi_n$ and $Li_xSiSn_n$.

10. The nanocomposite electrode of claim 4, wherein the anode material includes nitrides, and the nitrides include $Li_xVN$.

11. The nanocomposite electrode of claim 1, wherein the first average particle size and the second average particle size are in the range of 20 nm to 300 nm.

12. The nanocomposite electrode of claim 8, wherein the at least one nanoparticulate electrically conducting filler material is a carbon material in an amount of about 5% based on weight of the open porous nanocomposite material.

13. The nanocomposite electrode of claim 4, wherein the anode material is selected from the group consisting of $Li_xAlSi_n$, $Li_xSiSn_n$, and $Li_xVN$.

14. The nanocomposite electrode of claim 1, wherein the nanoparticles of the nanoparticulate electronically active material have an orthorhombic crystal structure with space group Pnma.

* * * * *

UNITED STATES PATENT AND TRADEMARK OFFICE
CERTIFICATE OF CORRECTION

PATENT NO. : 9,761,867 B2
APPLICATION NO. : 12/722269
DATED : September 12, 2017
INVENTOR(S) : Reinhard Nesper et al.

Page 1 of 1

It is certified that error appears in the above-identified patent and that said Letters Patent is hereby corrected as shown below:

In the Specification

Column 10, Line 3, "(~0.80)" should be "(~0.8C)"

Signed and Sealed this
Fourth Day of June, 2019

Andrei Iancu
*Director of the United States Patent and Trademark Office*